(12) United States Patent
Liu et al.

(10) Patent No.: US 8,674,361 B2
(45) Date of Patent: Mar. 18, 2014

(54) PIXEL STRUCTURE AND METHOD OF MAKING THE SAME

(75) Inventors: En-Hung Liu, Hsin-Chu (TW); Ching-Sheng Cheng, Hsin-Chu (TW); Chih-Hung Shih, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 241 days.

(21) Appl. No.: 12/982,848

(22) Filed: Dec. 30, 2010

(65) Prior Publication Data
US 2011/0309402 A1 Dec. 22, 2011

(30) Foreign Application Priority Data

Jun. 18, 2010 (TW) ................................ 99120020 A (51) Int. Cl.
| | |
|---|---|
| H01L 29/04 | (2006.01) |
| H01L 29/10 | (2006.01) |
| H01L 31/00 | (2006.01) |
| H01L 21/00 | (2006.01) |
| H01L 21/84 | (2006.01) |

(52) U.S. Cl.
USPC 257/59; 257/72; 257/E33.064; 257/E29.117; 438/149; 438/151

(58) Field of Classification Search
USPC ................ 257/E27.13, E27.131, E27.152, 257/E51.019, 59, 60, 72, E33.064, 257/E51.026, E29.117
See application file for complete search history.

(56) References Cited

U.S. PATENT DOCUMENTS

| | | | |
|---|---|---|---|
| 2003/0071952 A1 | 4/2003 | Yoshida | |
| 2009/0121982 A1* | 5/2009 | Choi et al. | 345/76 |
| 2010/0019998 A1* | 1/2010 | You et al. | 345/87 |

FOREIGN PATENT DOCUMENTS

CN 101639597 A 2/2010

* cited by examiner

*Primary Examiner* — Benjamin Sandvik
*Assistant Examiner* — Leslie Pilar Cruz
(74) *Attorney, Agent, or Firm* — Winston Hsu; Scott Margo (57) ABSTRACT

A pixel structure includes a substrate, a gate line and a gate electrode disposed on the substrate, an insulating layer covering the substrate, a semiconductor layer disposed on the insulating layer, a data line, a source electrode, and a drain electrode which are disposed on the insulating layer and the semiconductor layer, a planarization layer disposed on the data line, the source electrode, and the drain electrode, and a pixel electrode disposed on the planarization layer. The planarization layer has a through hole exposing the drain electrode. The pixel electrode is electrically connected to the drain electrode via the through hole and includes an opaque main electrode and a plurality of transparent branch electrodes disposed on the planarization layer. One end of each transparent branch electrode is electrically connected to the opaque main electrode.

24 Claims, 12 Drawing Sheets

PIXEL STRUCTURE AND METHOD OF MAKING THE SAME

BACKGROUND OF THE INVENTION

1. Field of the Invention

The present invention relates to a pixel structure and a method of making the same, and more particularly, to a pixel structure and a method of making the same which use an opaque conducting material as a main electrode of the pixel electrode.

2. Description of the Prior Art

According to the rapid development of the large-size liquid crystal display panels, the liquid crystal display panels must have a property of multi-viewing angles to satisfy the demands of use. Because of the advantages of multi-viewing angles and low response time, the multi-domain vertical alignment (MVA) liquid crystal display panels have become the mainstream products of the large-size display panels.

The conventional MVA liquid crystal display panel provides multi-viewing angle function by making the liquid crystal molecules in different areas slant in different directions with protrusions (bumps). However, the manufacture of protrusions increases the complexity of the process and the protrusions may block part of light so that the transmittance is decreased. Therefore, the brightness of the conventional MVA liquid crystal display panel is deteriorated.

Accordingly, a polymer stabilized alignment (PSA) technology, which uses polymers to replace the protrusions in the MVA liquid crystal display panel, is further developed to make the liquid crystal molecules in different areas slant in different directions, and therefore the multi-viewing angle function can be exhibited.

In the liquid crystal display panel which applies the PSA technology, the pixel electrodes made of transparent conducting materials have a main electrode arranged along a vertical direction and a plurality of branch electrodes arranged along different directions to make the liquid crystal molecules in different areas slant in different directions. Also, the liquid crystal display panel which applies the PSA technology in combination with a linear polarizer may have high contrast ratio to satisfy the requirement of the market. However, in the condition of combining the linear polarizer, only the liquid crystal molecules which are corresponding to the branch electrodes of the pixel electrode may contribute their brightness, while the liquid crystal molecules which are corresponding to the main electrode may not be able to contribute their brightness so that the transmittance is decreased. Moreover, due to the limitation of width of the transparent conducting material, such as indium tin oxide having a width limit of about 4 µm (micrometer) to 5 µm, when applying the liquid crystal display panel with PSA technology into the high resolution display device, the problems mentioned above are becoming the main problem to improve the transmittance.

SUMMARY OF THE INVENTION

It is therefore one of the objectives of the present invention to provide a pixel structure and a method of making the same to increase the transmittance of the pixel structure.

In accordance with an embodiment of the present invention, a pixel structure includes a substrate, a gate line, an insulating layer, a semiconductor layer, a data line, a source electrode, a drain electrode, a planarization layer, and a pixel electrode. The gate line and the gate electrode are disposed on the substrate, the insulating layer covers the substrate, the semiconductor layer is disposed on the insulating layer, the data line, the source electrode, and the drain electrode are disposed on the insulating layer and on the semiconductor layer, the planarization layer is disposed on the data line, the source electrode, and the drain electrode, and the pixel electrode is disposed on the planarization layer. The gate electrode, the semiconductor layer, the source electrode, and the drain electrode form a thin film transistor. The planarization layer has a through hole, which exposes the drain electrode, and the pixel electrode is electrically connected to the drain electrode via the through hole. Further, the pixel electrode includes an opaque main electrode disposed on the planarization layer and a plurality of transparent branch electrodes. The opaque main electrode includes a first opaque main electrode disposed along a first axis, and an end of each of the branch transparent electrodes is electrically connected to the first opaque main electrode.

In accordance with another embodiment of the present invention, a method of forming a pixel structure includes the following steps. A substrate is provided and a first patterned opaque conducting layer is formed on the substrate. An insulating layer is then formed on the substrate to cover the first patterned opaque conducting layer, and a semiconductor layer is formed on the insulating layer. A second patterned opaque conducting layer is then formed on the insulating layer and on the semiconductor layer, and a planarization layer is formed on the second patterned opaque conducting layer. Then, a third patterned opaque conducting layer is formed on the planarization layer, and a patterned transparent conducting layer is formed on the planarization layer. The first patterned opaque conducting layer includes a gate line and a gate electrode. The second patterned opaque conducting layer includes a source electrode and a drain electrode. The gate electrode, the semiconductor layer, the source electrode, and the drain electrode form a thin film transistor. The planarization layer has a through hole exposing the drain electrode. The patterned transparent conducting layer includes a plurality of transparent branch electrodes. An end of each of the transparent branch electrodes is electrically connected to the third patterned opaque conducting layer to form a pixel electrode, and the pixel electrode is electrically connected to the drain electrode via the through hole.

The pixel structure of the present invention uses opaque materials to construct the main electrode of the pixel electrode so that the width of the main electrode may be reduced, and thus the transmittance of the pixel structure is further increased.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention, preferred embodiments will be made in detail. The preferred embodiments of the present invention are illustrated in the accompanying drawings with numbered elements.

Figure 1:
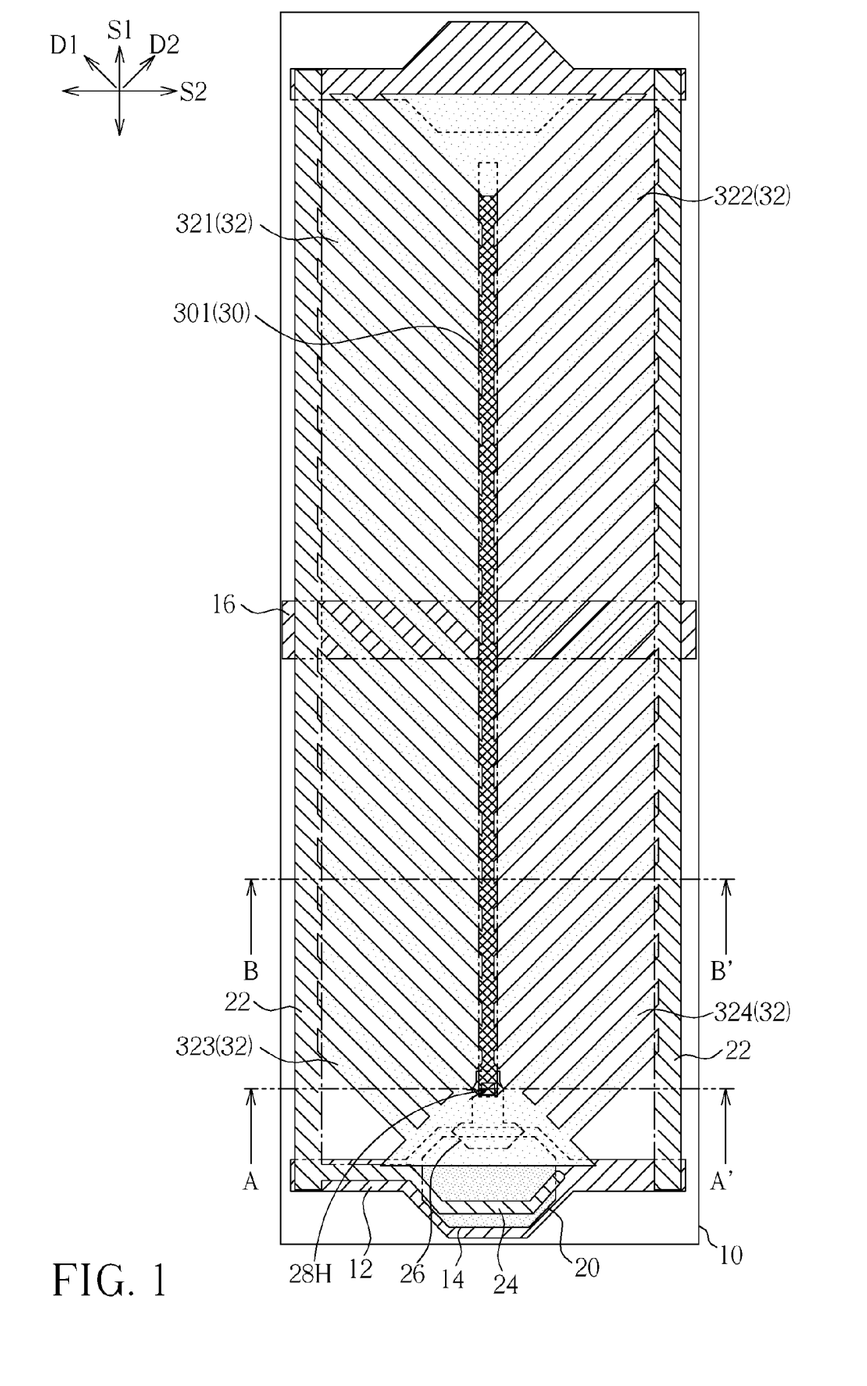
FIG. 1 illustrates a top view of a pixel structure according to a first preferred embodiment of the present invention.
Figure 2:
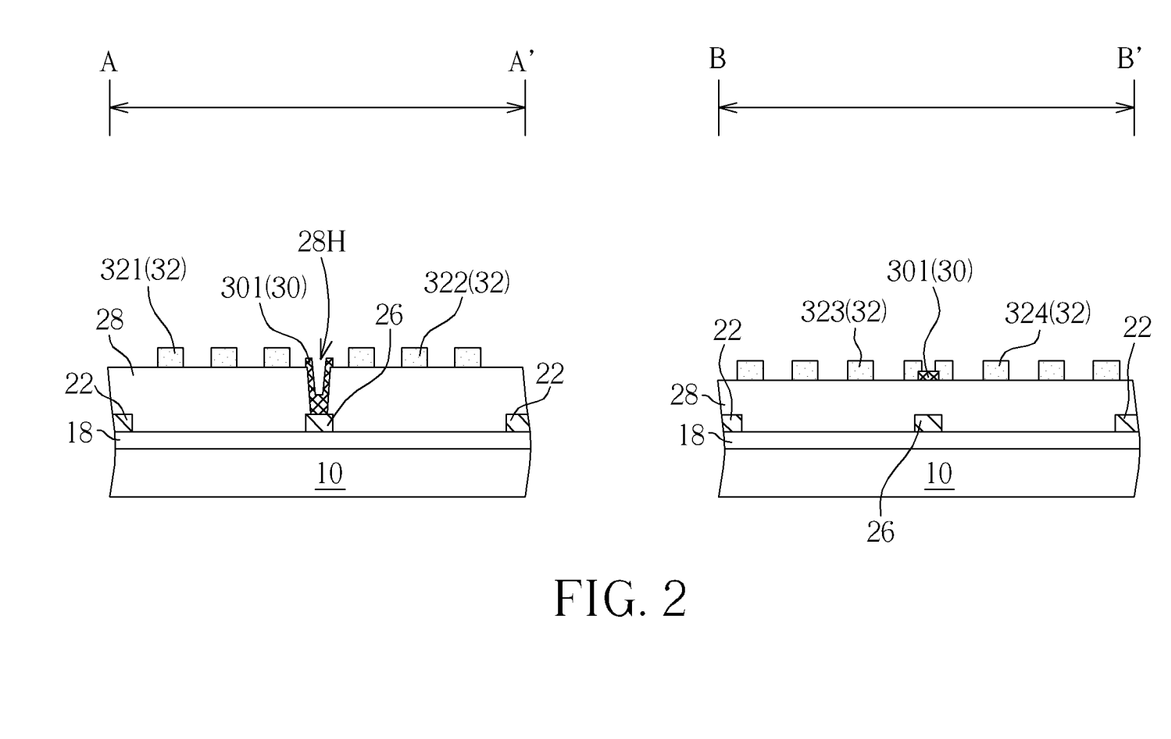
FIG. 2 illustrates a cross-sectional view of the pixel structure along lines A-A' and B-B' in FIG. 1.

Please refer to FIG. 1 and FIG. 2. FIG. 1 illustrates a top view of a pixel structure according to a first preferred embodiment of the present invention. FIG. 2 illustrates a cross-sectional view of the pixel structure along lines A-A' and B-B' in FIG. 1. As shown in FIG. 1 and FIG. 2, the method of forming the pixel structure of the present embodiment includes the following steps. First of all, a substrate 10 is provided. Then, a first patterned opaque conducting layer is formed on the substrate 10. The first patterned opaque conducting layer may be a single-layered metal pattern or a composite-layered metal pattern, such as a molybdenum/aluminum/molybdenum layer, but is not limited thereto. The first patterned opaque conducting layer includes a gate line 12 and a gate electrode 14, and may optionally include a common line 16. The gate line 12 is disposed on one side of the pixel structure, the gate electrode 14 is connected to the gate line 12 and extends toward the pixel structure, and the common line 16 is disposed substantially parallel to the gate line 12 and penetrates the pixel structure. Then, an insulating layer 18 (not shown in FIG. 1) is formed, covering the first patterned opaque conducting layer on the substrate 10. The insulating layer 18 may be used as a gate insulating layer, and the material of the insulating layer 18 may be any kinds of dielectric materials, such as silicon oxide, silicon nitride, or silicon oxynitride, but is not limited thereto. Subsequently, a semiconductor layer 20, such as an amorphous silicon layer, is formed on the insulating layer 18, and the semiconductor layer 20 is substantially disposed corresponding to the gate electrode 14.

Then, a second patterned opaque conducting layer is formed on the insulating layer 18 and on the semiconductor layer 20. The second patterned opaque conducting layer may be a single-layered metal pattern or a composite-layered metal pattern, such as a molybdenum/aluminum/molybdenum layer, but is not limited thereto. The second opaque conducting pattern includes a data line 22, a source electrode 24, and a drain electrode 26. The data line 22 is disposed on one side of the pixel structure and substantially perpendicular to the gate line 12, and the data line 22 is electrically connected to the source electrode 24. The source electrode 24 and the drain electrode 26 are substantially corresponding to the two opposite sides of the gate electrode 14. The gate electrode 14, the semiconductor layer 20, the source electrode 24, and the drain electrode 26 form a thin film transistor. Next, a planarization layer (a passivation layer) 28 (not shown in FIG. 1) is formed on the second patterned opaque conducting layer. The planarization layer 28 has at least a through hole 28H which partially exposes the drain electrode 26. The planarization layer 28 may be a single-layered structure or a composite-layered structure made of inorganic materials or organic materials.

Afterward, a third patterned opaque conducting layer 30 and a patterned transparent conducting layer 32 are formed on the planarization layer 28. The third patterned opaque conducting layer 30 may be a single-layered metal pattern or a composite-layered metal pattern, such as a molybdenum/aluminum/molybdenum layer. The patterned transparent conducting layer 32 may be a metal oxide pattern layer, such as an indium tin oxide layer or an indium zinc oxide layer, but is not limited thereto. In the present embodiment, the third patterned opaque conducting layer 30 is formed on the planarization layer 28 first, and the patterned transparent conducting layer 32 is subsequently formed on the third opaque conducting layer 30 and on the planarization layer 28. The patterned transparent conducting layer 32 partially contacts and electrically connected to the third patterned opaque conducting layer 30.

In the present embodiment, the third opaque conducting layer 30 may include an opaque main electrode and the opaque main electrode includes a first opaque main electrode 301 disposed on the planarization layer 28 and arranged along a first axis S1 (such as the vertical direction in FIG. 1), that is, the first opaque main electrode 301 penetrates the pixel structure along the long axis direction and the first opaque main electrode 301 is electrically connected to the drain electrode 26 via the through hole 28H. The patterned transparent conducting layer 32 may include a plurality of transparent branch electrodes disposed on the planarization layer 28. An end of each of the transparent branch electrodes is in contact with and electrically connected to the third patterned opaque conducting layer 30 so as to form a pixel electrode. Further, the common electrode 16 and the pixel electrode partially overlap, forming a storage capacitor. In the present embodiment, the transparent branch electrodes include a plurality of first transparent branch electrodes 321 and a plurality of second transparent branch electrodes 322. The first transparent branch electrodes 321 are disposed on the left side of the first opaque main electrode 301 and parallelized along a first direction D1. An end of each of the first transparent electrodes 321 is in contact with and electrically connected to the first opaque main electrode 301. The second transparent branch electrodes 322 are disposed on the right side of the first opaque main electrode 301 and parallelized along a second direction D2. An end of each of the second transparent branch electrodes 322 is in contact with and electrically connected to the first opaque main electrode 301. Moreover, an included angle between the first direction D1 and the first axis S1 is substantially 45 degrees and an included angle between the second direction D2 and the first axis S1 is substantially 45 degrees. In other words, the first direction D1 and the second direction D2 are substantially perpendicular to each other but are not limited thereto. The function of the transparent branch electrodes is to make the corresponding liquid crystal molecules arranged along different directions and to provide multi-viewing angles. Therefore, the arranged directions of the transparent branch electrodes are not limited to the method mentioned above. In the present embodiment, the pixel structure may have two different alignment areas by disposing the first transparent branch electrodes 321 and the second transparent branch electrodes 322.

As mentioned above, in some conditions, such as using the PSA technology with linear polarizer, the liquid crystal molecules corresponding to the first axis do not contribute their brightness, which results in a decrease in the transmittance of the pixel structure. Under such a condition, the minimum limit of the width of the opaque conducting materials, such as metal, corresponding to the first axis may be reduced to 3 μm (micrometer) or even lower. Therefore, the first opaque main electrode 301 of the pixel structure of the embodiment is made of the opaque conducting materials because the minimum limit of the opaque conducting materials is lower than the minimum limit of the transparent conducting materials. As a result, the width of the first opaque main electrode 301 may be reduced to 3 μm (micrometer) or even lower. Thus, the area which are corresponding to the first opaque main electrode and do not contribute their brightness is decreased and therefore the transmittance of the pixel structure is increased.

The pixel structure of the present invention is not limited to the application to the liquid crystal display panels which use PSA technology combining with the linear polarizer, but may be apply to all kinds of liquid crystal display panels combining with all kinds of polarizer. The pixel structure and the method of making the same of the present invention are not limited to the above embodiment, and may have other embodiments or variations. Other embodiments and variation embodiments of the present invention are described below, and in order to compare the difference between the embodiments and to describe briefly, same components are denoted by same numerals, and repeated parts are not redundantly described.

Figure 3:
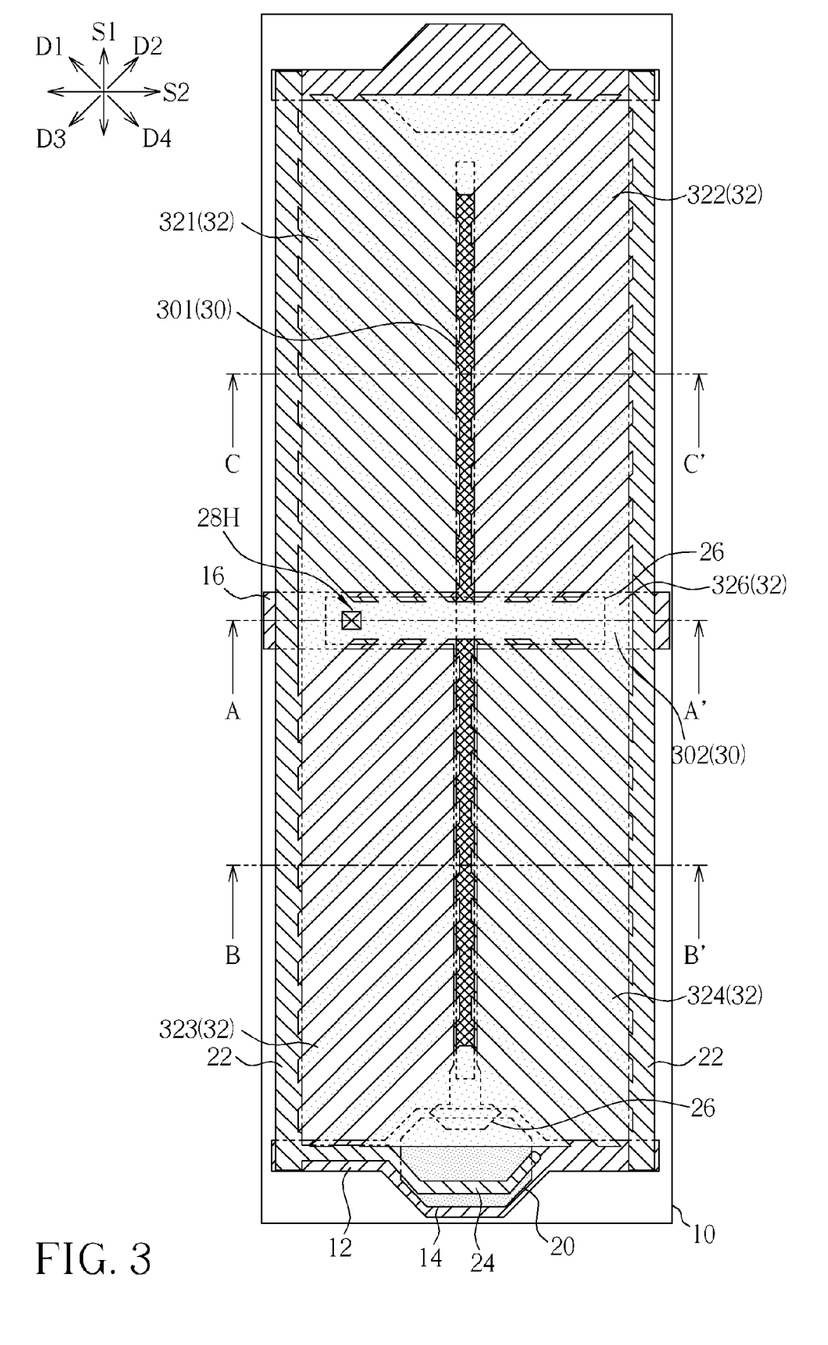
FIG. 3 illustrates a top view of a pixel structure according to a second preferred embodiment of the present invention.
Figure 4:
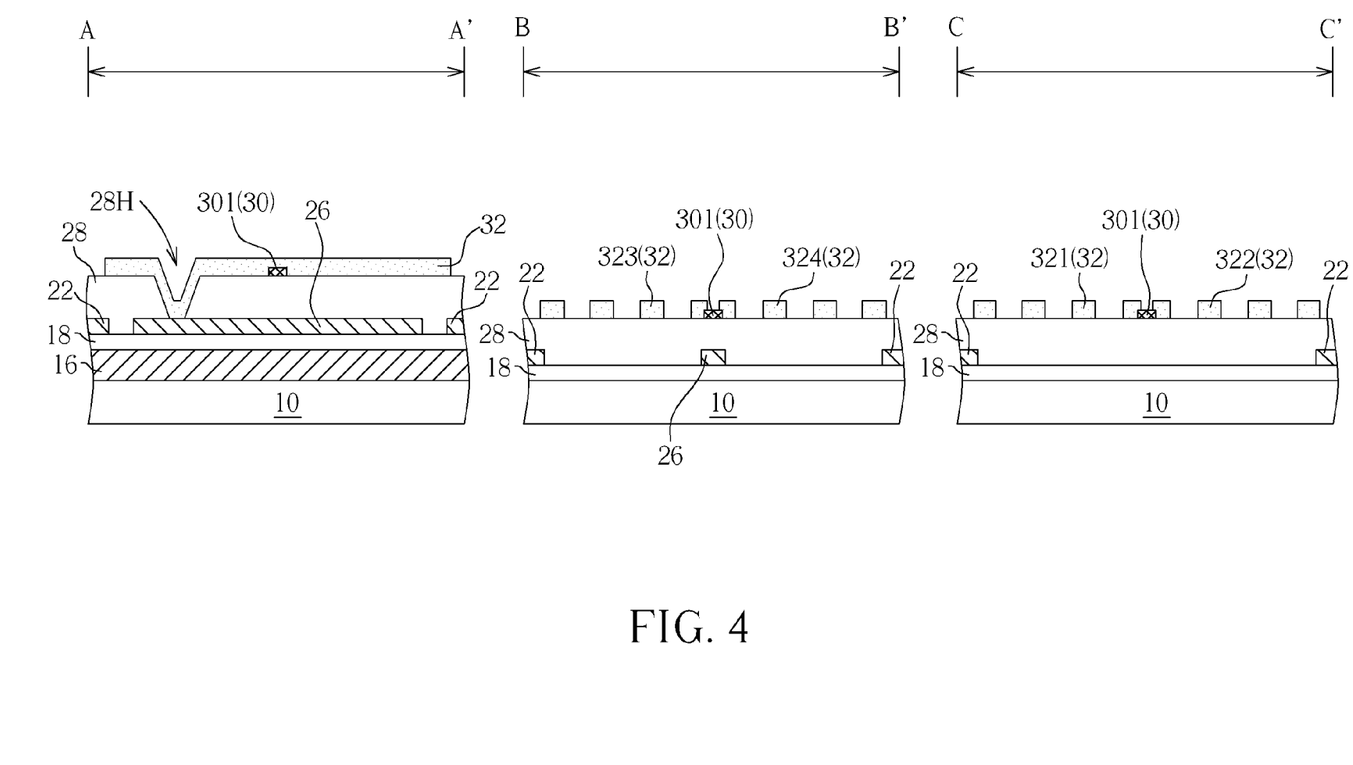
FIG. 4 illustrates a cross-sectional view of the pixel structure along lines A-A', B-B', and C-C' in FIG. 3.

Please refer to FIG. 3 and FIG. 4. FIG. 3 illustrates a top view of a pixel structure according to a second preferred embodiment of the present invention. FIG. 4 illustrates a cross-sectional view of the pixel structure along lines A-A', B-B', and C-C' in FIG. 3. As shown in FIG. 3 and FIG. 4, in the present embodiment, the drain electrode 26 may extend into the center of the pixel structure but is not limited thereto. For example, the drain electrode 26 may also only be disposed in the peripheral region of the pixel structure. The third patterned opaque conducting layer 30 is formed on planarization layer 28 first, and the transparent conducting pattern 32 is subsequently formed on the third patterned opaque conducting layer 30 and the planarization layer 28. The transparent conducting layer 32 and the third patterned opaque conducting layer 30 partially contact to each other, and are electrically connected. The third patterned opaque conducting layer 30 may include an opaque main electrode, and the opaque electrode includes a first opaque main electrode 301 disposed on the planarization layer 28 and arranged along the first axis S1. The patterned transparent conducting layer 32 may include a second transparent main electrode 326 disposed on the planarization layer 28 and arranged along a second axis S2, which is substantially perpendicular to the first axis S1, and a plurality of transparent branch electrodes disposed on the planarization layer 28. An end of each of the transparent branch electrodes is in contact with and electrically connected to the third patterned opaque conducting layer 30 to form a pixel electrode. The pixel electrode is electrically connected to the drain electrode 26 via the through hole 28H. Further, the common electrode 16, the drain electrode 26 and the pixel electrode partially overlap, forming a storage capacitor. In the present embodiment, the transparent branch electrodes includes a plurality of first transparent branch electrodes 321 and a plurality of second transparent branch electrodes 322. The first transparent branch electrodes 321 are disposed on the left side of the first opaque main electrode 301 and parallelized along the first direction D1. One end of at least parts of the first transparent branch electrodes 321 is electrically connected to and in contact with the first opaque main electrode 301. The second transparent branch electrodes 322 are disposed on the right side of the first opaque main electrode 301 and parallelized along the second direction D2.

One end of at least parts of the second transparent branch electrodes 322 is electrically connected to and in contact with the first opaque main electrode 301. Moreover, the included angle between the first direction D1 and the first axis S1 is substantially 45 degrees and the included angle between the second direction D2 and the first axis S1 is substantially 45 degrees. In other words, the first direction D1 and the second direction D2 are substantially perpendicular to each other but are not limited thereto. In order to increase the effect of multi-viewing angles, in addition to the first transparent branch electrode 321 and the second transparent branch electrode 322, the transparent electrode may further include a plurality of third transparent branch electrodes 323 and a plurality of fourth transparent branch electrodes 324. The third transparent branch electrodes 323 are disposed on the left side of the first opaque main electrode 301 and parallelized along a third direction D3, and at least one end of parts of the third transparent branch electrodes 323 is electrically connected to the first opaque main electrode 301. The fourth transparent branch electrodes 324 are disposed on the right side of the first opaque main electrode 301 and parallelized along a fourth direction D4, and one end of at least parts of the fourth transparent branch electrodes 324 is electrically connected to the first opaque main electrode 301. Moreover, an included angle between the first direction D1 and the third direction D3 is substantially 90 degrees, an included angle between the third direction D3 and the second direction D2 is substantially 180 degrees, an included angle between the fourth direction D4 and the first direction D2 is substantially 90 degrees, and an included angle between the fourth direction D4 and the first direction D1 is substantially 180 degrees, but are not limited thereto. In the present embodiment, the second transparent main electrode 326 is filled into the through hole 28H and electrically connected to the drain electrode 26, and the third patterned opaque conducting layer 30 is electrically connected to the drain electrode 26 via the second transparent main electrode 326 of the patterned transparent conducting layer 32, but is not limited thereto. In the present embodiment, by disposing the first transparent branch electrode 321, the second transparent branch electrode 322, the third transparent branch electrode 323, and the fourth transparent branch electrode 324, the pixel structure has four different alignment areas.

Figure 5:
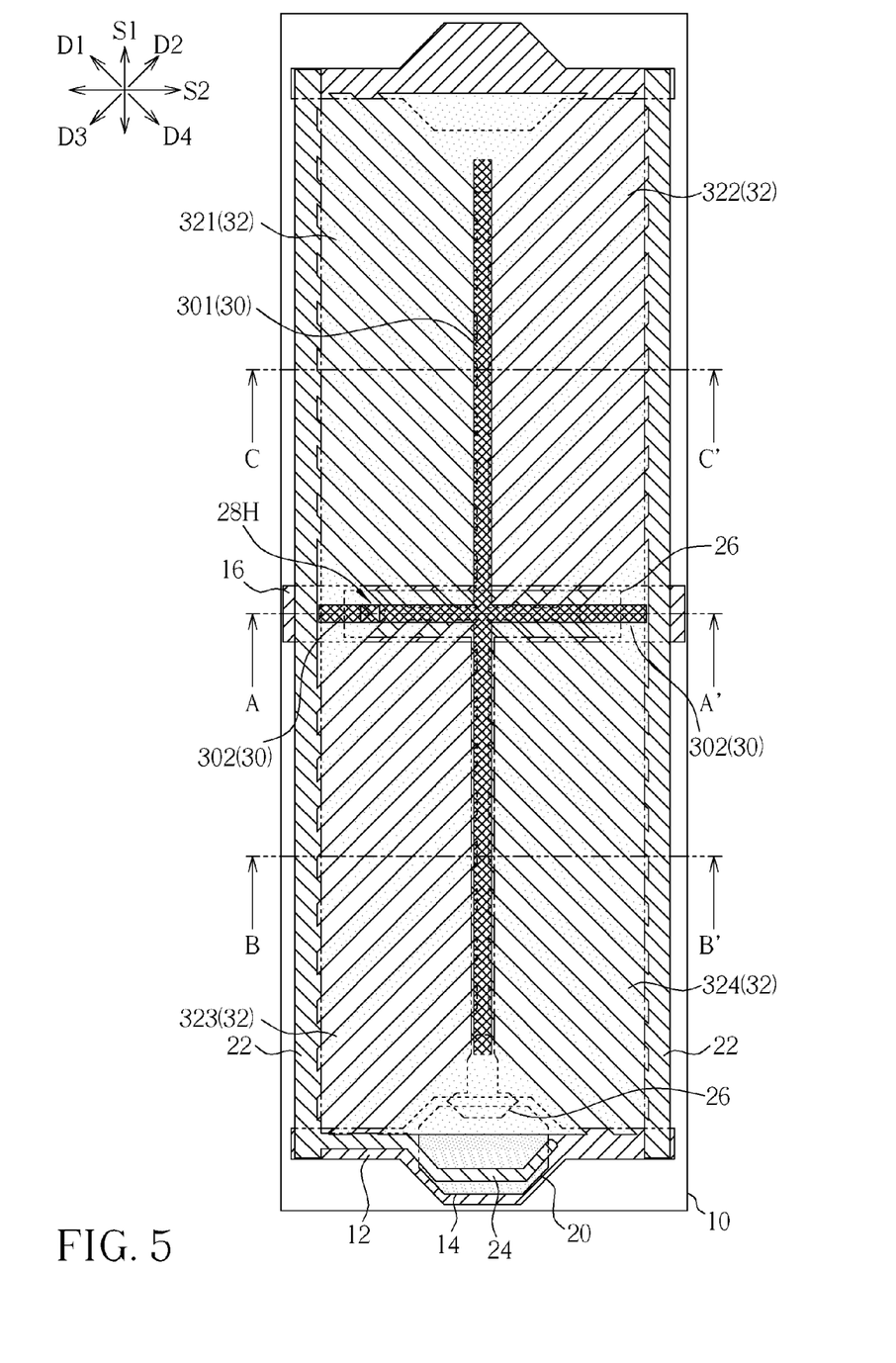
FIG. 5 illustrates a top view of a pixel structure according to a third preferred embodiment of the present invention.
Figure 6:
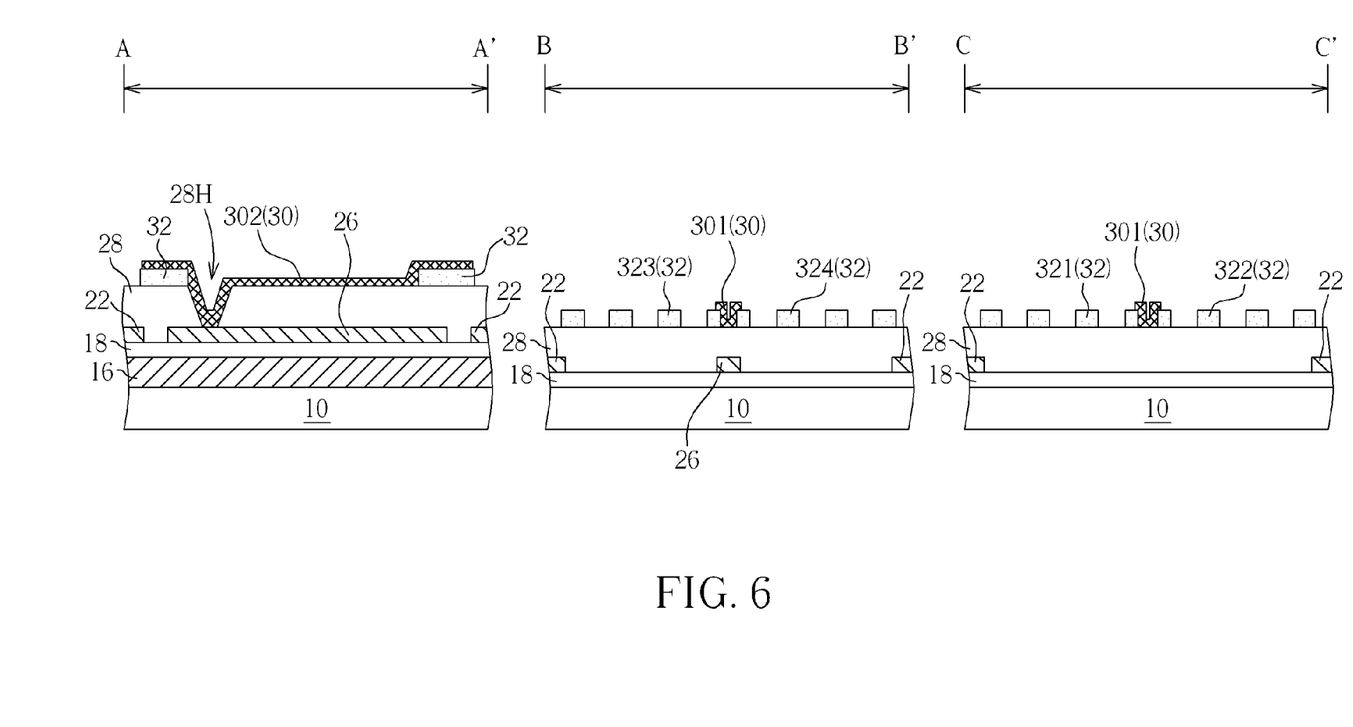
FIG. 6 illustrates a cross-sectional view of the pixel structure along lines A-A', B-B', and C-C' in FIG. 5.

Please refer to FIG. 5 and FIG. 6. FIG. 5 illustrates a top view of a pixel structure according to a third preferred embodiment of the present invention. FIG. 6 illustrates a cross-sectional view of the pixel structure along lines A-A', B-B', and C-C' in FIG. 5. As shown in FIG. 5 and FIG. 6, in the present embodiment, the opaque main electrode of the third patterned opaque conducting layer 30 includes a first opaque main electrode 301 arranged along the first axis S1 and a second opaque main electrode 302 arranged along the second axis S2, which is substantially perpendicular to the first axis S1. The second opaque main electrode 302 is electrically connected to the first opaque main electrode 301. Further, a part of the first transparent branch electrodes 321 are in contact with and electrically connected to the first opaque main electrode 301, and a part of the first transparent branch electrodes 321 are in contact with and electrically connected to the second opaque main electrode 302. A part of the second transparent branch electrodes 322 are in contact with and electrically connected to the first opaque main electrode 301, and a part of the second transparent branch electrodes 322 are in contact with and electrically connected to the second opaque main electrode 302. A part of the third transparent branch electrodes 323 are in contact with and electrically connected to the first opaque main electrode 301, and a part of the third transparent branch electrodes 323 are in contact with and electrically connected to the second opaque main electrode 302. A part of the fourth transparent branch electrodes 324 are in contact with and electrically connected to the first opaque main electrode 301, and a part of the fourth branch electrodes 324 are in contact with and electrically connected to the second opaque main electrode 302. Also, the patterned transparent conducting layer 32 is formed on the planarization layer 28 in advance, and the third opaque conducting pattern 30 is then formed on the patterned transparent conducting layer 32 and the planarization layer 28 (not shown in FIG. 5) so that the transparent main electrode is disposed beneath the opaque main electrode but is not limited thereto. For example, the opaque main electrode may also be disposed beneath the transparent main electrode. Moreover, because the transparent conducting pattern 32 does not include the second transparent main electrode in the present embodiment, the through hole 28H is filled with the second opaque main electrode 302, and the second opaque main electrode 302 is electrically connected to the drain electrode 26.

Figure 7:
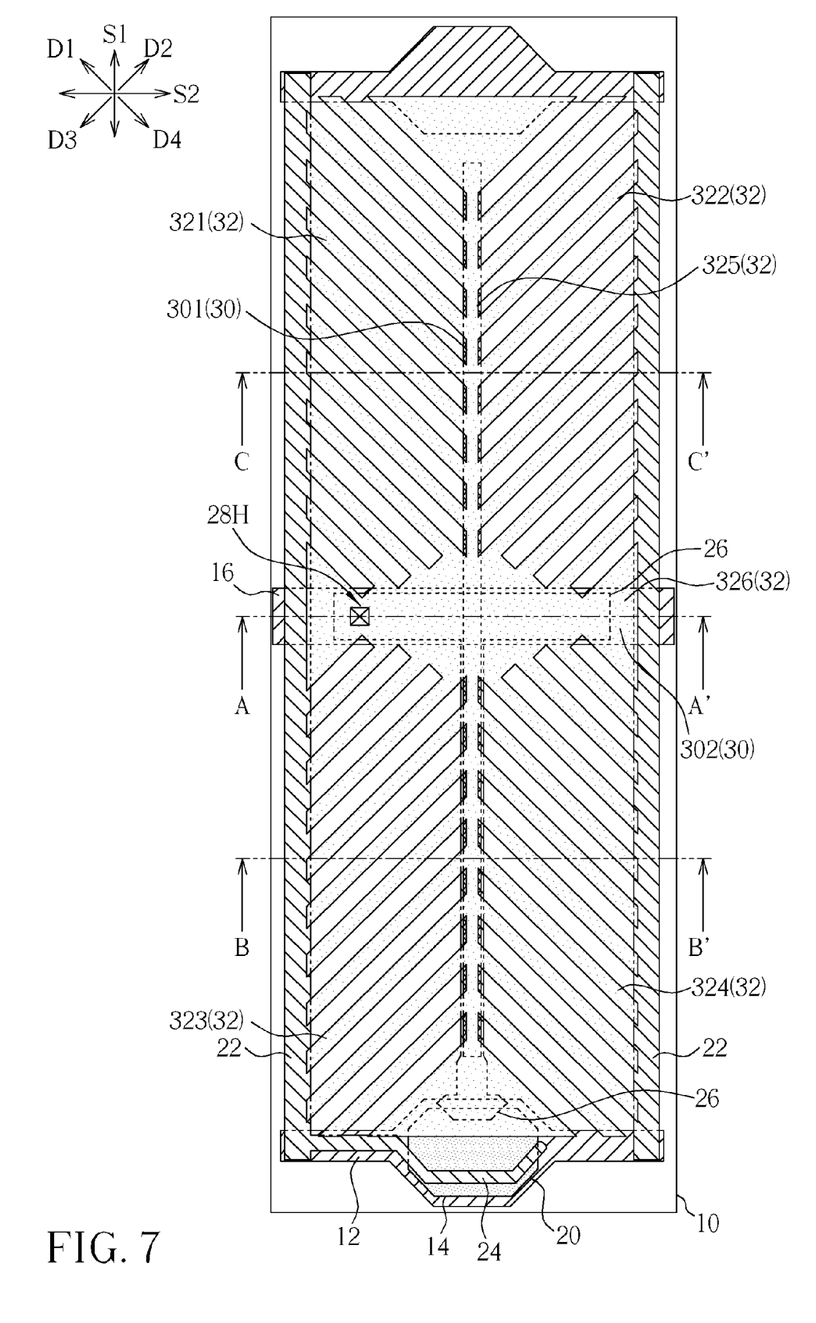
FIG. 7 illustrates a top view of a pixel structure according to a fourth preferred embodiment of the present invention.
Figure 8:
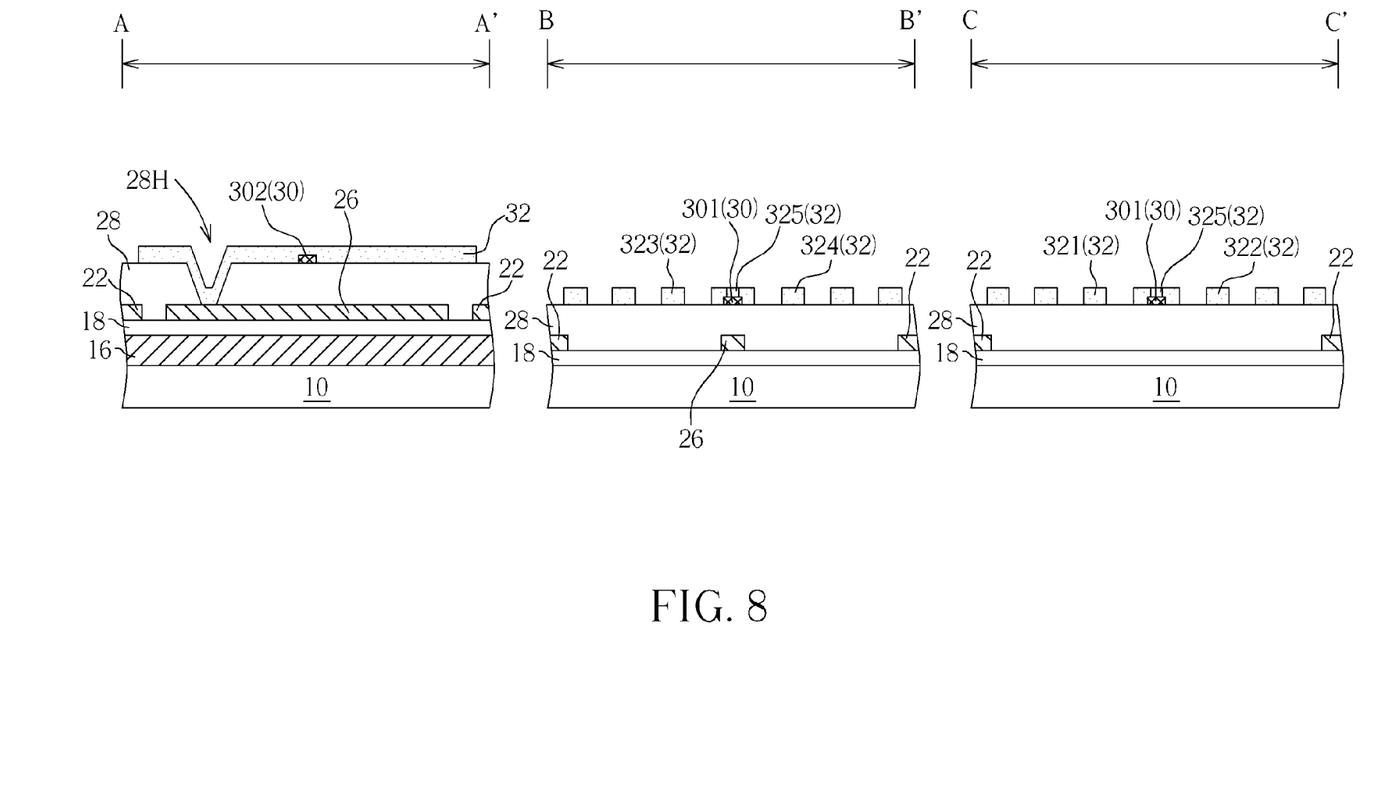
FIG. 8 illustrates a cross-sectional view of the pixel structure along lines A-A', B-B', and C-C' in FIG. 7.

Please refer to FIG. 7 and FIG. 8. FIG. 7 illustrates a top view of a pixel structure according to a fourth preferred embodiment of the present invention. FIG. 8 illustrates a cross-sectional view of the pixel structure along lines A-A', B-B', and C-C' in FIG. 7. As shown in FIG. 7 and FIG. 8, in the present embodiment, in addition to the transparent branch electrodes, the patterned transparent conducting layer 32 may further include a transparent main electrode, and the transparent main electrode is electrically connected to the opaque main electrode and to the transparent branch electrodes. The transparent main electrode at least includes a first transparent main electrode 325 disposed along the first axis S1 and a second transparent electrode 326 disposed along the axis S2 which is substantially perpendicular to the first axis S1. The first transparent main electrode 325 and the first opaque main electrode 301 at least partially overlap and contact to each other. Further, the third patterned opaque conducting layer 30 is formed on the planarization layer 28 in advance, and the patterned transparent conducting layer 32 is then formed on the third patterned opaque conducting layer 30 and on the planarization layer 28 (not shown in FIG. 7) so that the opaque main electrode is disposed beneath the transparent main electrode but is not limited thereto. For example, the transparent main electrode may also be disposed beneath the opaque main electrode. It is appreciated that as defining the first transparent main electrode 325, the predetermined width may be set to be lower than or equal to the minimum limit of the width of the first transparent main electrode 325 so that the transmittance of the pixel structure is decreased. For example, the width of the first transparent main electrode 325 is set to be 3 μm (micrometer) and the width of the first transparent main electrode 325 may be lower than the minimum limit of the width thereof. Under such a condition, the first transparent main electrode 325 may be broken in the process. However, because the first transparent main electrode 325 and the first opaque main electrode 301 overlap and contact to each other, the transparent branch electrodes may still be electrically connected to each other through the first opaque main electrode 301 without causing the problem of line broken.

Figure 9:
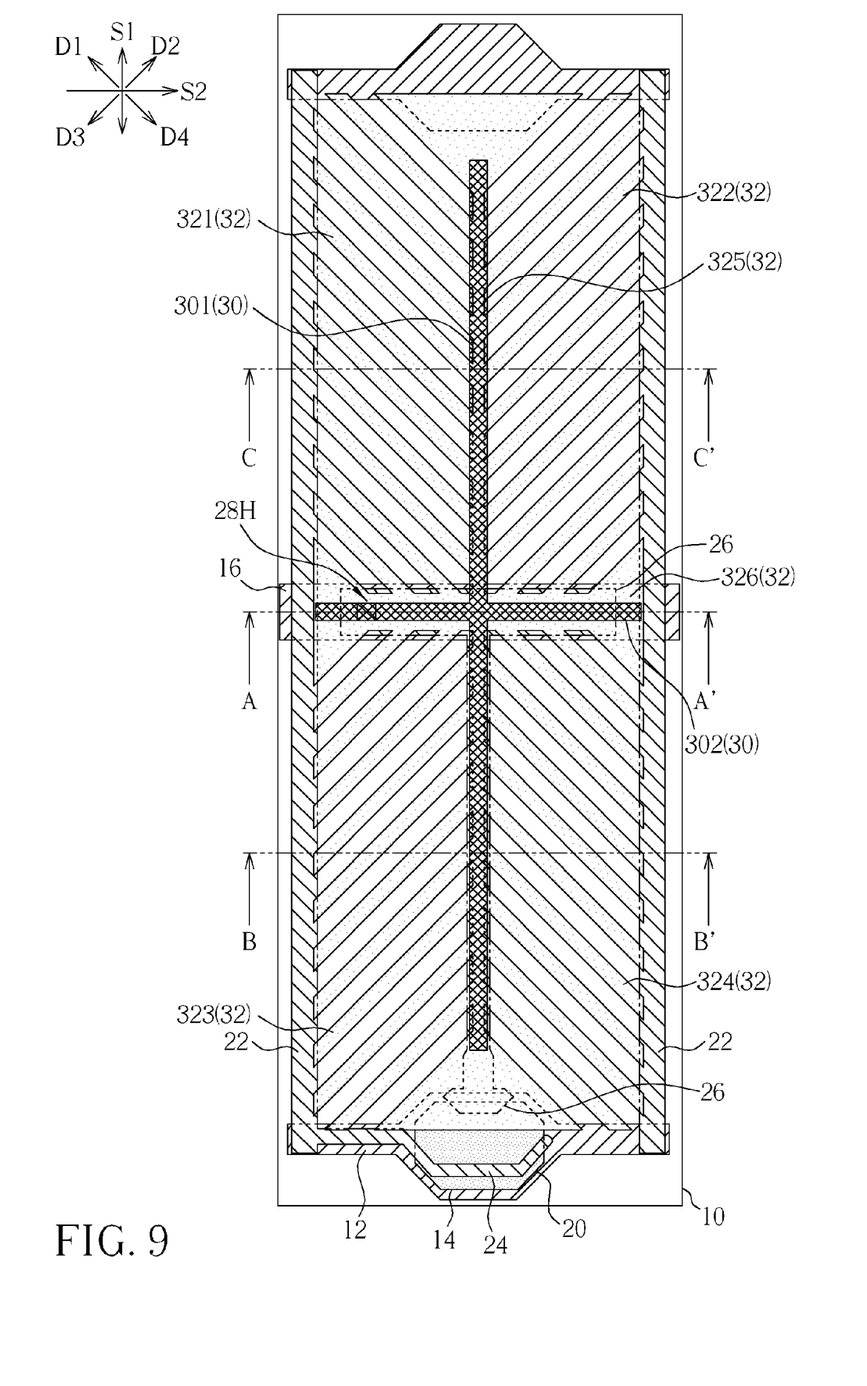
FIG. 9 illustrates a top view of a pixel structure according to a fifth preferred embodiment of the present invention.
Figure 10:
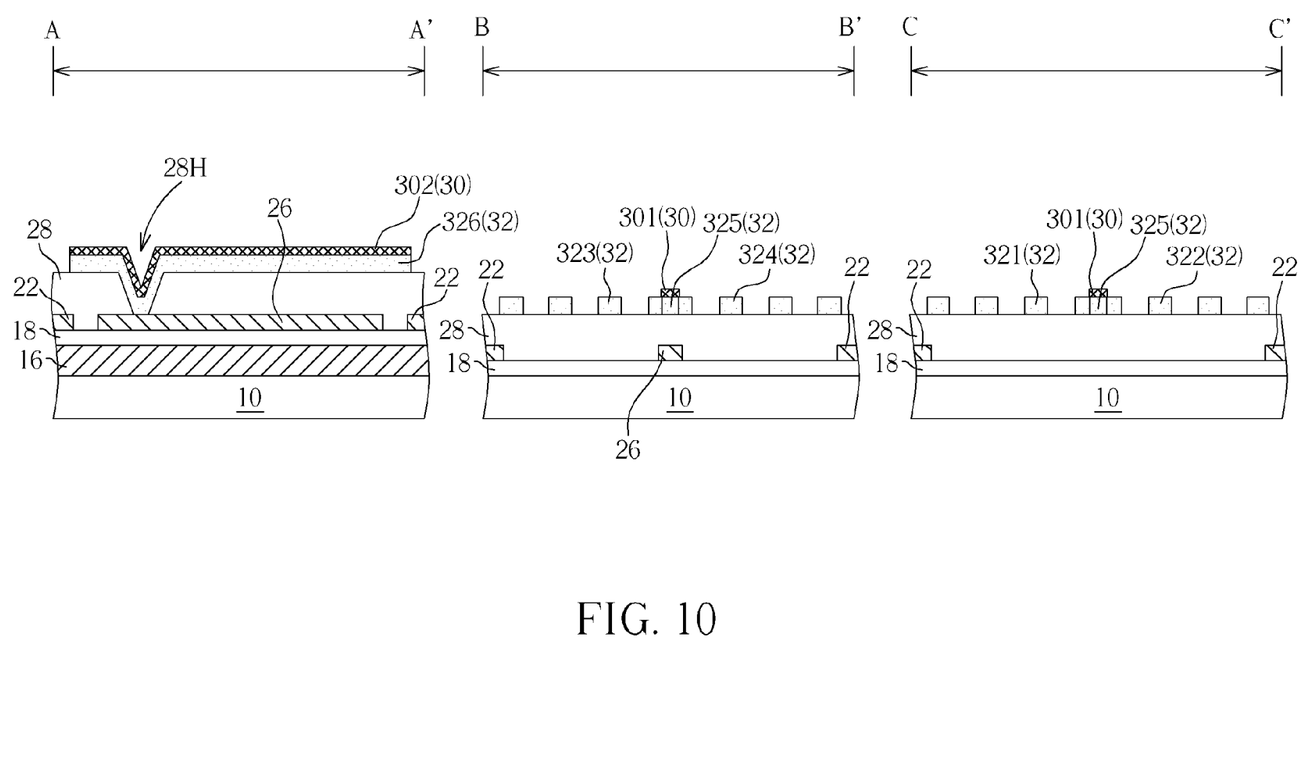
FIG. 10 illustrates a cross-sectional view of the pixel structure along lines A-A', B-B', and C-C' in FIG. 9

Please refer to FIG. 9 and FIG. 10. FIG. 9 illustrates a top view of a pixel structure according to a fifth preferred embodiment of the present invention. FIG. 10 illustrates a cross-sectional view of the pixel structure along lines A-A', B-B', and C-C' in FIG. 9 As shown in FIG. 9 and FIG. 10, in the present embodiment, the opaque main electrode of the third patterned opaque conducting layer 30 includes a first opaque main electrode 301 arranged along the first axis S1 and a second opaque main electrode 302 arranged along the second axis S2 which is substantially perpendicular to the first axis S1. The second opaque main electrode 302 is electrically connected to the first opaque main electrode 301. Further, the transparent main electrode of the patterned transparent conducting layer 32 includes a first transparent main electrode 325 disposed along the first axis S1 and a second transparent main electrode 326 disposed along the second axis S2. The first transparent main electrode 325 and the first opaque main electrode 301 at least partially overlap and contact to each other, and the second transparent main electrode 326 and the second opaque main electrode 302 at least partially overlap and contact to each other. In the present embodiment, it is preferred that the width of the first opaque main electrode 301 and that of the second opaque main electrode 302 are close to the width limit, such as 3 μm (micrometer). In addition, it is preferred that the width of the first transparent main electrode 325 is smaller than or equal to the width of the first opaque main electrode 301 and the width of the second transparent main electrode 326 is smaller than or equal to the width of the second opaque main electrode 302 so that the transmittance may be improved. It is appreciated that in the present embodiment, the transparent main electrode is disposed beneath the opaque main electrode but is not limited thereto. For example, the opaque main electrode may be disposed beneath the transparent main electrode.

Figure 11:
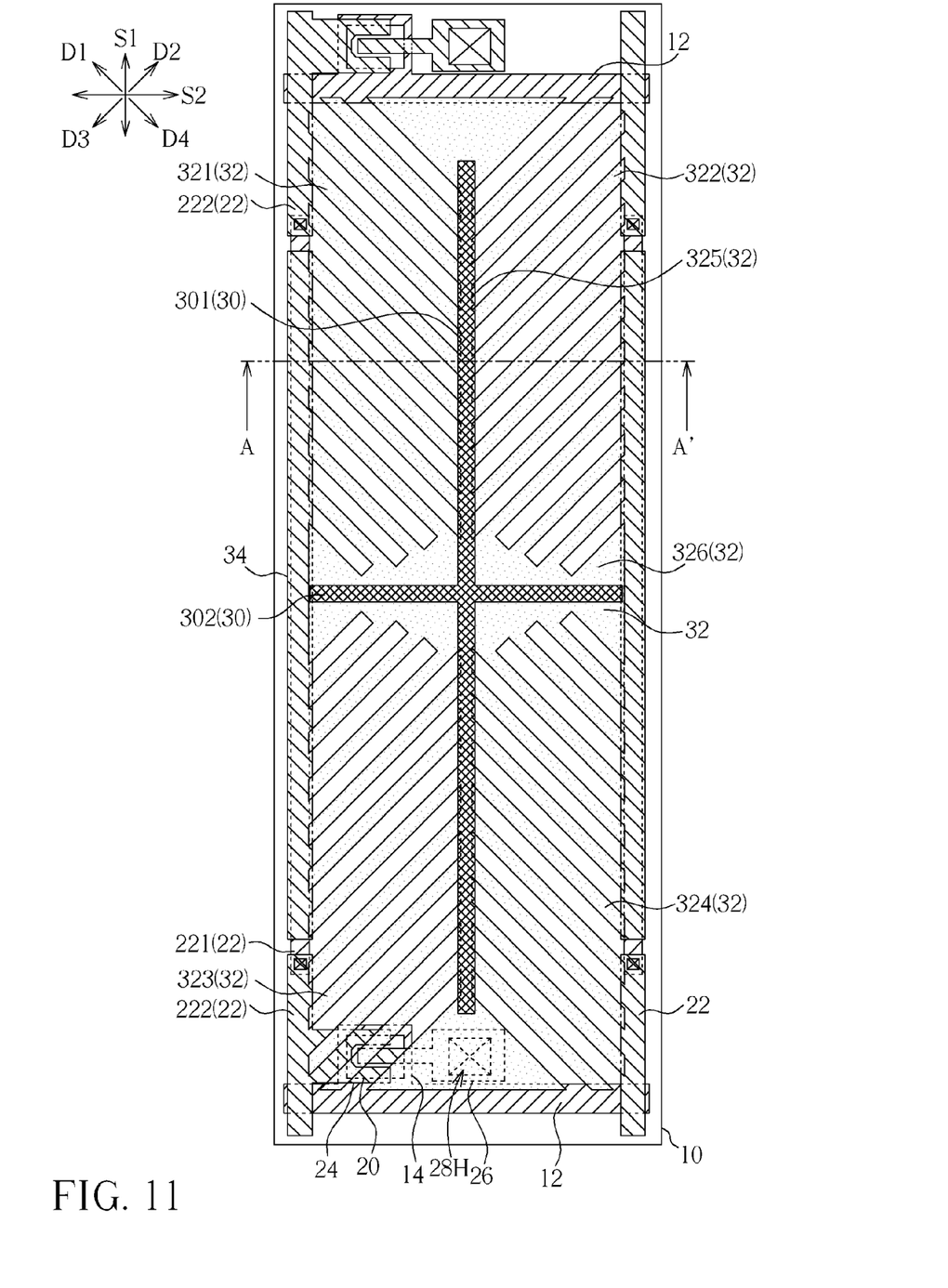
FIG. 11 illustrates a top view of a pixel structure according to a sixth preferred embodiment of the present invention.
Figure 12:
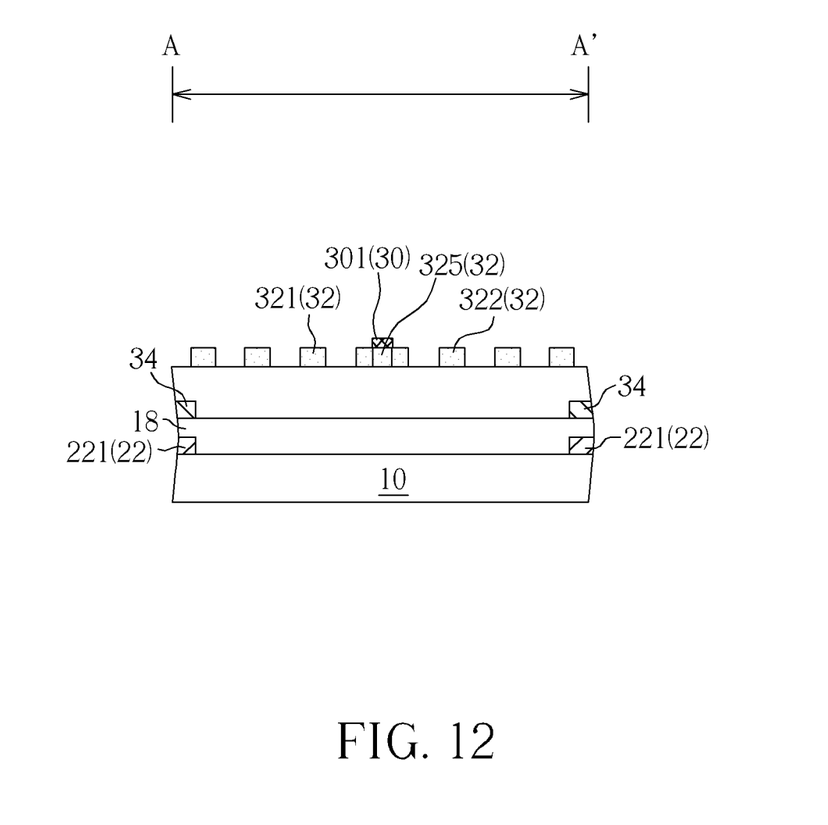
FIG. 12 illustrates a cross-sectional view of the pixel structure along lines A-A', B-B', and C-C' in FIG. 11.

Please refer to FIG. 11 and FIG. 12. FIG. 11 illustrates a top view of a pixel structure according to a sixth preferred embodiment of the present invention. FIG. 12 illustrates a cross-sectional view of the pixel structure along lines A-A', B-B', and C-C' in FIG. 11. As shown in FIG. 11 and FIG. 12, in the present embodiment, the data line 22 includes a first data line segment 221 and a second data line segment 222 which are electrically connected to each other. The first data line segment 221, the gate line 12, and the gate electrode 14 are made of a first patterned opaque conducting layer, the second data line 222, the source electrode 24, and the drain electrode 26 are made of a second patterned opaque conducting layer, and the opaque main electrode is made of a third patterned opaque conducting layer 30. Moreover, the second patterned opaque conducting layer may further include a storage capacitor line disposed correspondingly on the first data line segment 321 and electrically separated from the first data line segment 321. The storage capacitor line 34 may be a common line or a conducting line with other signals, and the storage capacitor line 34 and the patterned transparent conducting layer 32 partially overlap, forming a storage capacitor. Furthermore, the structure of the pixel electrode of the present embodiment may be chosen from any structures described in this embodiments mentioned above. For example, the opaque main electrode of the third patterned opaque conducting layer 30 may include a first opaque main electrode 301 arranged along the first axis S1 and a second opaque main electrode 302 disposed along the second axis S1 which is substantially perpendicular to the first axis S1. The second opaque main electrode 302 is electrically connected to the first opaque main electrode 301. The transparent main electrode of the patterned transparent conducting layer 32 may include a first transparent main electrode 325 disposed along the first axis S1 and a second transparent main electrode 326 disposed along the second axis S2. The first transparent main electrode 325 and the first opaque main electrode 301 at least partially overlap and contact to each other, and the second transparent main electrode 326 and the second opaque main electrode 302 at least partially overlap and contact to each other. In the present embodiment, the transparent main electrode is disposed beneath the opaque main electrode but is not limited thereto. For example, the opaque main electrode may be disposed beneath the transparent main electrode.

In summary, the pixel structure of the present invention uses the opaque conducting material to produce the main electrode of the pixel electrode so that the width of the main electrode may be decreased and the transmittance of the pixel structure may be further increased.

Those skilled in the art will readily observe that numerous modifications and alterations of the device and method may be made while retaining the teachings of the invention.

What is claimed is:

1. A pixel structure, comprising:
   a substrate;
   a gate line and a gate electrode, disposed on the substrate;
   an insulating layer, covering the substrate;
   a semiconductor layer, disposed on the insulating layer;
   a data line, a source electrode, and a drain electrode, disposed on the insulating layer and on the semiconductor layer, wherein the gate electrode, the semiconductor layer, the source electrode, and the drain electrode forming a thin film transistor;
   a planarization layer, disposed on the data line, the source electrode, and the drain electrode, wherein the planarization layer has a through hole exposing the drain electrode; and
   a pixel electrode, disposed on the planarization layer, the pixel electrode being electrically connected to the drain electrode via the through hole, wherein the pixel electrode comprises:
      an opaque main electrode, disposed on the planarization layer, wherein the opaque main electrode comprises a first opaque main electrode disposed along a first axis; and
      a plurality of transparent branch electrodes, wherein an end of each of the transparent branch electrodes is electrically connected to the first opaque main electrode,
      wherein the pixel electrode further comprises a transparent main electrode, electrically connected to the opaque main electrode and to the transparent branch electrodes, the transparent main electrode comprises a first transparent main electrode disposed along the first axis, the first transparent main electrode at least partially overlaps and contacts the first opaque main electrode, and the opaque main electrode is disposed on the transparent main electrode.

2. A pixel structure, comprising:
   a substrate;
   a gate line and a gate electrode, disposed on the substrate;
   an insulating layer, covering the substrate;
   a semiconductor layer, disposed on the insulating layer;
   a data line, a source electrode, and a drain electrode, disposed on the insulating layer and on the semiconductor layer, wherein the gate electrode, the semiconductor layer, the source electrode, and the drain electrode forming a thin film transistor;
   a planarization layer, disposed on the data line, the source electrode, and the drain electrode, wherein the planarization layer has a through hole exposing the drain electrode; and
   a pixel electrode, disposed on the planarization layer, the pixel electrode being electrically connected to the drain electrode via the through hole, wherein the pixel electrode comprises:
      an opaque main electrode, disposed on the planarization layer, wherein the opaque main electrode comprises a first opaque main electrode disposed along a first axis; and
      a plurality of transparent branch electrodes, wherein an end of each of the transparent branch electrodes is electrically connected to the first opaque main electrode,
      wherein the opaque main electrode is made of an opaque conducting material, the transparent branch electrodes are made of a transparent conducting material, and a minimum limit of a line width of the opaque conducting material is lower than a minimum limit of a line width of the transparent conducting material.

3. The pixel structure according to claim 2, wherein the transparent branch electrodes comprise a plurality of first transparent branch electrodes and a plurality of second transparent branch electrodes, the first transparent branch electrodes are disposed on a left side of the first opaque main electrode and parallelized along a first direction, and the second transparent branch electrodes are disposed on a right side of the first opaque main electrode and parallelized along a second direction.

4. The pixel structure according to claim 2, wherein the pixel electrode further comprises a transparent main electrode, electrically connected to the opaque main electrode and to the transparent branch electrodes, the transparent main electrode comprises a first transparent main electrode disposed along the first axis, and the first transparent main electrode at least partially overlaps and contacts the first opaque main electrode.

5. The pixel structure according to claim 4, wherein a width of the first transparent main electrode is less than or equal to a width of the first opaque main electrode.

6. The pixel structure according to claim 4, wherein the transparent main electrode and the transparent branch electrodes are made of a same patterned transparent conducting layer.

7. The pixel structure according to claim 4, wherein the opaque main electrode is disposed on the transparent main electrode.

8. The pixel structure according to claim 4, wherein the opaque main electrode is disposed beneath the transparent main electrode.

9. The pixel structure according to claim 2, wherein the gate line and the gate electrode are made of a first patterned opaque conducting layer, the data line, the source electrode, and the drain electrode are made of a second patterned opaque conducting layer, and the opaque main electrode is made of a third patterned opaque conducting layer.

10. The pixel structure according to claim 2, wherein the data line comprises a first data line segment and a second data line segment, the first data line segment, the gate line, and the gate electrode are made of a first patterned opaque conducting layer, the second data line segment, the source electrode, and the drain electrode are made of a second patterned opaque conducting layer, and the opaque main electrode is made of a third patterned opaque conducting layer.

11. The pixel structure according to claim 2, wherein the opaque main electrode further comprises a second opaque main electrode disposed along a second axis, being substantially perpendicular to the first axis, and the second opaque main electrode is electrically connected to the first opaque main electrode.

12. The pixel structure according to claim 11, wherein the pixel electrode further comprises a transparent main electrode, electrically connected to the opaque main electrode and the transparent branch electrodes, the transparent main electrode comprises a first transparent main electrode disposed along the first axis, and a second transparent main electrode disposed along the second axis, the first transparent main electrode at least partially overlaps and contacts the first opaque main electrode, and the second transparent main electrode at least partially overlaps and contacts the second opaque main electrode.

13. The pixel structure according to claim 12, wherein a width of the first transparent main electrode is less than or equal to a width of the first opaque main electrode and a width of the second transparent main electrode is less than or equal to a width of the second opaque main electrode.

14. The pixel structure according to claim 12, wherein the first transparent main electrode, the second transparent electrode, and the transparent branch electrodes are made of a same patterned transparent conducting layer.

15. The pixel structure according to claim 2, wherein the pixel structure has a long axis direction substantially parallel to a direction of the data line, and the first axis penetrating the pixel structure along the long axis direction of the pixel structure.

16. The pixel structure according to claim 2, wherein an end of at least a portion of the transparent branch electrodes are connected to and in contact with the opaque main electrode.

17. A method of forming a pixel structure, comprising:
providing a substrate;
forming a first patterned opaque conducting layer on the substrate, wherein the first patterned opaque conducting layer comprises a gate line and a gate electrode;
forming an insulating layer on the substrate to cover the first patterned opaque conducting layer;
forming a semiconductor layer on the insulating layer;
forming a second patterned opaque conducting layer on the insulating layer and on the semiconductor layer, the second patterned opaque conducting layer comprising a source electrode and a drain electrode, wherein the gate electrode, the semiconductor layer, the source electrode, and the drain electrode form a thin film transistor;
forming a data line, electrically connected to the source electrode;
forming a planarization layer on the second patterned opaque conducting layer, wherein the planarization layer has a through hole exposing the drain electrode;
forming a third patterned opaque conducting layer on the planarization layer, wherein the third patterned opaque conducting layer comprises an opaque main electrode, and the opaque main electrode comprises a first opaque main electrode disposed along a first axis; and
forming a patterned transparent conducting layer on the planarization layer, the patterned transparent conducting layer comprising a plurality of transparent branch electrodes, wherein an end of each of the transparent branch electrodes is electrically connected to the third patterned opaque conducting layer to form a pixel electrode, and the pixel electrode is electrically connected to the drain electrode via the through hole, wherein the opaque main electrode is made of an opaque conducting material, the transparent branch electrodes are made of a transparent conducting material, and a minimum limit of a line width of the opaque conducting material is lower than a minimum limit of a line width of the transparent conducting material.

18. The method of forming the pixel structure according to claim 17, wherein the transparent branch electrodes comprise a plurality of first transparent branch electrodes and a plurality of second transparent branch electrodes, the first transparent branch electrodes are disposed on a left side of the first opaque main electrode and parallelized along a first direction, and the second transparent branch electrodes are disposed on a right side of the first opaque main electrode and parallelized along a second direction.

19. The method of forming the pixel structure according to claim 17, wherein forming the patterned transparent conducting layer further comprises forming a first transparent main electrode disposed along the first axis, the first transparent main electrode is electrically connected to the transparent branch electrodes, and the first transparent main electrode at least partially overlaps and contacts the first opaque main electrode.

20. The method of forming the pixel structure according to claim 17, wherein forming the third patterned opaque conducting layer further comprises forming a second opaque main electrode, the second opaque main electrode is disposed along a second axis, being substantially perpendicular to the first axis, and the second opaque main electrode is electrically connected to the first opaque main electrode.

21. The method of forming the pixel structure according to claim 17, wherein forming the patterned transparent conducting layer further comprises forming a first transparent main electrode and a second transparent main electrode, and the second main electrode is substantially perpendicular to the first transparent main electrode, wherein the first transparent main electrode at least partially overlaps and contacts the first opaque main electrode, and the second transparent main electrode at least partially overlaps and contacts the second opaque main electrode.

22. The method of forming the pixel structure according to claim 17, wherein the third patterned opaque conducting layer is disposed beneath the patterned transparent conducting layer.

23. The method of forming the pixel structure according to claim 17, wherein forming the second patterned opaque conducting layer further comprises forming the data line, electrically connected to the source electrode.

24. The method of forming the pixel structure according to claim 17, wherein forming the first patterned opaque conducting layer further comprises forming a first data line segment of the data line on the substrate, and forming the second patterned opaque conducting layer further comprises forming a second data line segment of the data line, electrically connected to the first data line segment and the source electrode.

* * * * *